Sept. 13, 1955　　　　　　　E. V. BERGSTROM　　　　　　2,717,811
HYDROCARBON CONVERSION APPARATUS
Filed May 7, 1951　　　　　　　　　　　　　　　　2 Sheets-Sheet 1

INVENTOR.
Eric V. Bergstrom
BY
Charles A. Huggett
AGENT

Sept. 13, 1955  E. V. BERGSTROM  2,717,811
HYDROCARBON CONVERSION APPARATUS
Filed May 7, 1951
2 Sheets-Sheet 2
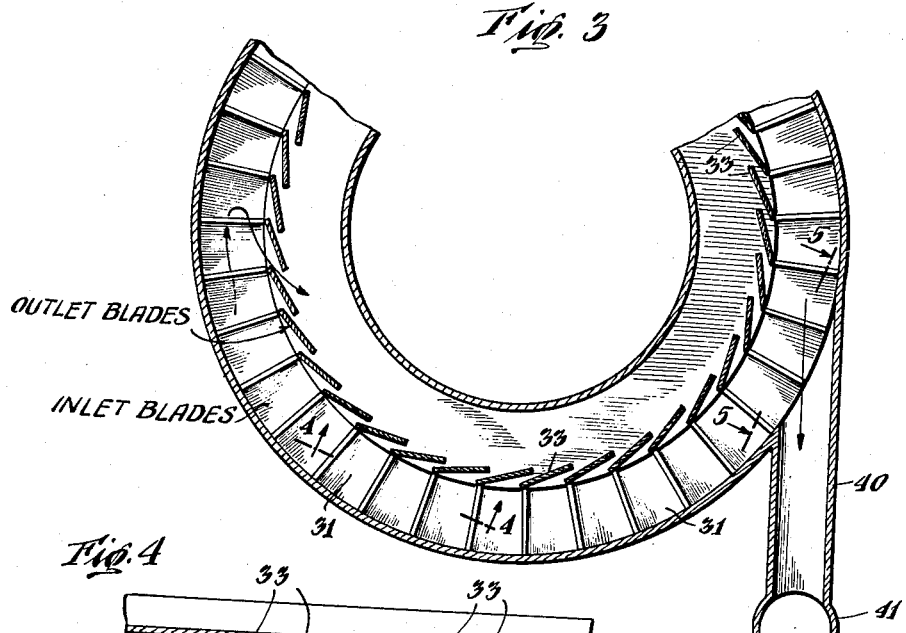
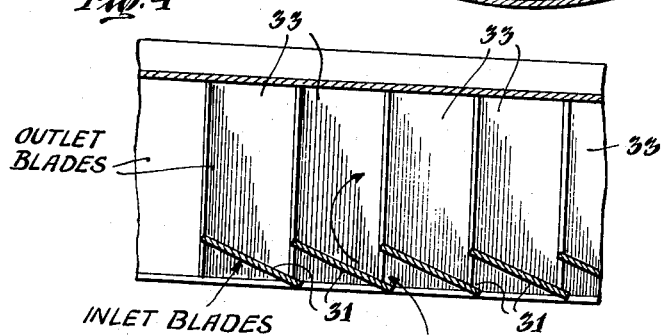
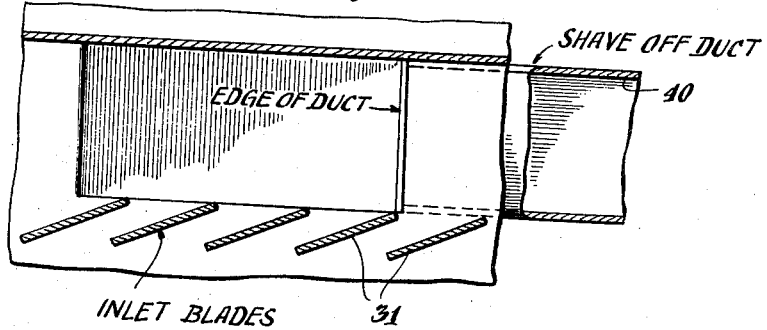
INVENTOR.
Eric V. Bergstrom
BY
Charles A. Huggett
AGENT N# United States Patent Office

2,717,811
Patented Sept. 13, 1955

2,717,811

HYDROCARBON CONVERSION APPARATUS

Eric V. Bergstrom, Short Hills, N. J., assignor to Socony Mobil Oil Company, Inc., a corporation of New York Application May 7, 1951, Serial No. 224,948

5 Claims. (Cl. 302—53)

This application is directed to improvements in a moving bed hydrocarbon conversion system which employs pneumatic transfer of the particle-form solid contact material. It has particular relation to a method and apparatus for separating dust particles, lift gas and granular material after the solids have been lifted upward by the lift gas through a laterally confined lift passage.

In the petroleum industry many processes are known in which hydrocarbons, at temperature and pressure suitable for conversion, are contacted with a granular solid material in the form of a gravitating column to produce converted products. While gravitating through the conversion zone, the particles receive a deposit of carbonaceous material or "coke" on their surface. The particles are removed from the bottom of the column to a reconditioning zone where they are contacted with a combustion supporting gas at temperatures high enough to burn off the coke deposits. The reconditioned contact material is returned thereafter to the top of the column in the conversion zone and reused. Gas lifts have been incorporated in these systems recently to continuously raise the contact particles and complete the continuous cyclic path.

Examples of various processes in this industry which necessitate the use of granular contact material are polymerization, dehydrogenation, isomerization, alkylation, hydrogenation, reforming, cyclization, desulfurization and catalytic cracking. This invention will be described in relation to a catalytic cracking process, being understood, however, to apply broadly to any process or operation in which a solid contact material in granular form is lifted pneumatically and gravitated through zones in substantially compact column form to complete an enclosed cyclic path. For example, it may be applied to conversion processes wherein hydrocarbons, prepared for conversion, are brought into contact with inert refractory particles and converted products are removed therefrom. Typical of such processes is the production of ethylene from various gas oils at temperatures in the neighborhood of 1500° F.

In the moving bed system of catalytic cracking, the particles in granular form are contacted with suitably prepared hydrocarbons while gravitating downwardly through a reaction zone in the form of a substantially compact column. The feed stock, usually a gas oil boiling somewhat above the gasoline boiling range, cracks in the presence of the hot catalyst, forming substantial amounts of hydrocarbons which do boil in the gasoline boiling range. Coked or spent catalyst is removed continuously from the bottom of the conversion or reaction zone and transferred to the top of a gravitating substantially compact column of particles in a regeneration zone. The catalyst, gravitating through the regeneration or reconditioning zone, is contacted with a combustion supporting gas, such as air, to burn off the coke deposits from the surface of the catalyst. The coke-free or regenerated catalyst is withdrawn from the bottom of the column in the regeneration zone and transferred to the top of the column in the reaction zone completing the continuous path.

This process involves the use of high temperatures and may involve the use of high pressures. For example, the reaction zone may be maintained at about 800–1100° F., suitable cracking temperature, and the regeneration zone may be maintained at about 1000–1300° F., suitable regeneration temperature. The catalyst is lifted therefore at temperatures of approximately 88–1200° F., or thereabouts.

As the catalyst material gravitates through the conversion zone, the gas or vapors contact the catalyst surface by passing through the voids between the particles. It is desirable that the gas be uniformly distributed throughout the bed for a variety of reasons. For example, channelling of the gas through the reactor causes non-uniform deposition of carbon or coke upon the particles and non-uniform conversion of the reactant charge. The cracking efficiency is materially reduced from that which is obtained when the gas flows uniformly through the bed. Channelling in the regenerator causes the overheating of some of the particles with consequent damage and loss of catalytic activity. Other particles in the bed are not sufficiently regenerated to regain their former cracking activity. In order to provide uniform gas flow and prevent channelling, it is desirable to utilize catalyst particles of generally uniform size and shape, although some irregularity of size of particles is tolerable. For example, they may take the form of pellets, pills, uniform granules and spheres, spheres or beads being preferred. The term "granular" when used in this specification refers broadly to solid particles of the size range used in moving bed conversion processes, whether regular or irregular in size or shape. The particle size may range from about 3–100 mesh Tyler Screen Analysis; but is preferably 4–10 mesh Tyler. For example, when using a granular catalyst of 4–10 mesh Tyler screen size, particles smaller than 10 mesh would be classed as fines and unsuitable for use in the process. The catalytic material may be natural or treated clays such as bentonite, montmorillonite or kaolin or may take the nature of certain synthetic associations of silica, alumina, silica and alumina, with or without various additional metallic oxides. These materials are well known in the petroleum and related arts, being produced in the form of hard refractory particles having enormous surface in relation to their small particle size. The particles have a density range of about 20–130 pounds per cu. ft., poured density. That is the density after the particles are merely poured into a receptacle and not packed. The particles may also be formed of inert materials such as, for example, mullite or corhart. One of the factors which causes channelling in these systems is the presence of particles substantially smaller than the average size of the particles commingled with the granular particles in the bed. The dust particles or fines, as they are referred to in this art, are caused by the rubbing of the granular particles, one against another, as they pass through the beds. Attrition, the technical name for the production of fines from granular particles, occurs also when the granules rub against the metal walls of the vessels, or impinge upon metal plates or baffles in the system, or impinge upon the surface of the contact beds. If the amount of fines in the system builds up to an excessive level, a number of difficulties arise, such as classification of the fines which causes uneven distribution of the fines in the beds, resulting in gas channelling. The increased fines also cause an increase in the pressure drop across the beds etc. Hence, the fines content must be kept below a maximum allowable level. This presents the difficult problem of removing the fines continuously from the continuously moving streams of granular contact material or catalyst.

Recently gas lifts have been used to raise the granular material in these conversion systems. In a preferred form, catalyst is withdrawn from the bottom of one of the columns to a feeding zone where it is contacted with a lift gas and conveyed upward through a laterally-confined lift path to a settling zone. Granular particles, and particles too small for reuse in the process, fines, are both lifted up the path by the gas and discharged from the upper end in the receiving zone. The contact material must be separated from the gas in the receiving zone and returned to the top of the other column. It is desirable to separate the particles too small for reuse in the process at this point. Hence, a purpose of this invention is to provide a removal of the gas and fines from the continuous stream of granular material or catalyst in the receiving or settling zone.

In these conversion systems, particularly the larger units, for example, cracking systems of 10,000–15,000 bbls. per stream day crude capacity, the fines production may run in the neighborhood of 1–5 tons per day. The cost of the catalyst is too high to permit the fines to be wasted. The fines are useful for other processes or as raw material for making new contact material and hence, it is desirable to recover them from the gas withdrawn from the lift. Therefore, after the granular material has been removed, the fines must be separated from the gas, before the gas is discharged from the system. It has been suggested that the fines may be separated in separators adjacent the separating vessel, such as a series of mechanical cyclone separators, the fines accumulating in drain legs below the separators. Theoretically the fines would be withdrawn from the lower levels of the long drain legs to receptacles located at ground level. This system, however, has several disadvantages. The large separators required are exceedingly expensive. The small fines tend to pack or bridge the drain legs at various points, causing the lines to plug and the flow therethrough to be interrupted. Also, the fines become impregnated with oils or liquids which cause them to solidify in a solid mass plugging the long downcomers from the separators to the fines vessel or pot. The downcomers must be periodically flushed or vibrated to keep them functioning.

It has been found that these and other difficulties can be overcome by the method and apparatus hereinafter disclosed in detail. Essentially, the improvement involves first the elutriation of the solids in the settling vessel at the top of the gas lift to remove the gas and entrained fines from the granular material. The gas and entrained fines are then passed through a separating zone in the top of the settling zone to split the gas into two streams; the first substantially free of fines, the second containing the bulk of the fines. The gas stream containing the concentrated fines is withdrawn downwardly to another separating zone near ground level. The separated fines are gravitated from this zone downwardly through a short connecting path to a fines accumulating zone, located just below said separating zone.

The object of this invention is to provide an improved hydrocarbon conversion process and apparatus therefor.

A further object is to provide a method and apparatus for removing fines from a moving bed hydrocarbon conversion system.

A further object of this invention is to provide method and apparatus for withdrawing lift gas and fines from a gas lift used to lift granular contact material in a moving bed conversion system.

A further object is to provide method and apparatus for separating granular material from lift gas and fines, after the materials are discharged from the upper end of an upwardly directed lift pipe at a level substantially above the ground, separating most of the gas from the gas and fines at the elevated level, transferring the remaining gas and fines to near ground level, and recovering the fines from the gas.

These and other objects will be made more apparent in the following discussion of the invention, read in conjunction with the sketches, all highly diagrammatic in form, in which;

Figure 3 is a horizontal cross-section of the top of the settling vessel on plane 3—3 of Figure 2.

Figure 4 is a fragmentary view showing the relation of inlet and outlet blades in the top of the settling vessel, as seen on plane 4—4 of Figure 3.

Figure 5 is a fragmentary view showing the connection of the outlet duct to the settling vessel as seen on plane 5—5 of Figure 3.

Figure 1:
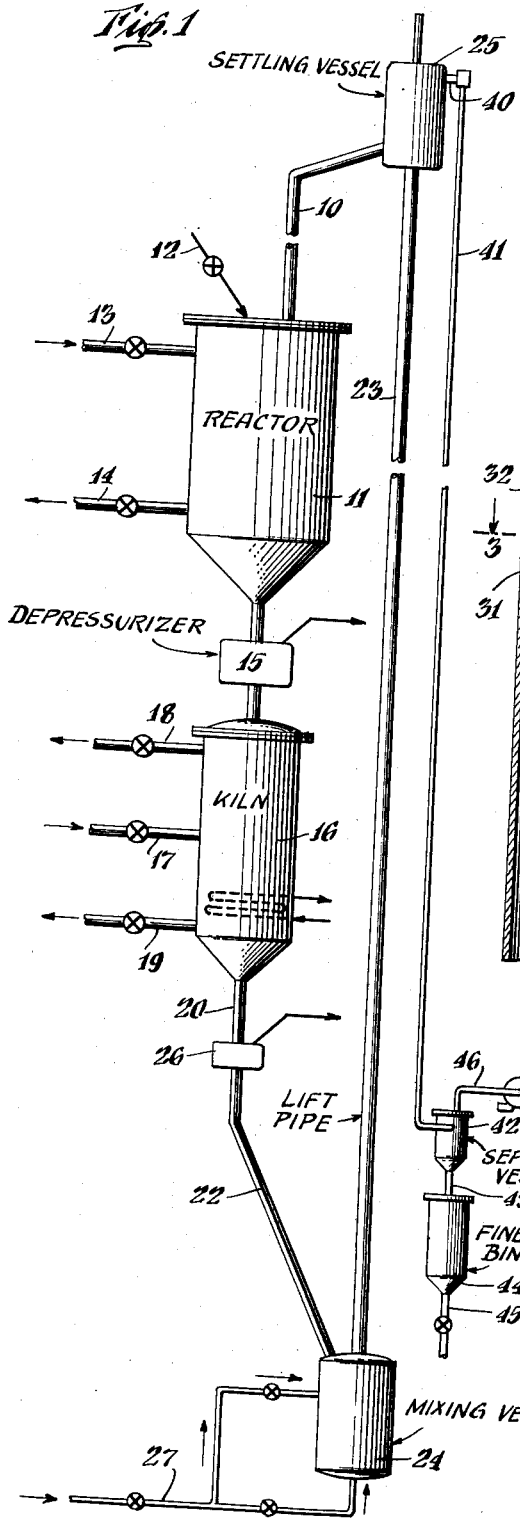
Figure 1 is a sketch of a moving bed hydrocarbon conversion system.

Referring to Figure 1, a moving bed hydrocarbon conversion system is illustrated. The granular contact material is gravitated as a substantially compact column downwardly through the feed leg 10 into the top of the reactor 11, forming a column therein. An inert gas is introduced through the conduit 12 into the upper section of the reactor 11 near the bottom of the feed leg 11 to prevent combustible gases from escaping up the feed leg. The reaction vessel 11 may be operated at a pressure which is higher than that in the rest of the system, i. e., 5–30 p. s. i. (gauge), and the catalyst will feed into the vessel through the conduit 10 without valves or restrictions, provided the leg is suitably shaped and sufficiently long. The feed leg must be substantially vertical, thereby requiring a taller gas lift when the pressure differential is increased. A suitable feed leg is disclosed and claimed in U. S. Patent No. 2,410,309, which issued on October 29, 1946.

The catalyst is gravitated through the reactor 11 as a compacted column and contacted therein with hydrocarbons, suitably prepared for reaction, introduced through the conduit 13. The reactants may be in liquid, vapor or mixed liquid and vapor form, preheated, generally, to about 700–800° F., although higher or lower temperature may, in certain instances, be used, depending, to some extent, upon the type of charging stock. The hydrocarbons are converted in the vessel, upon contacting the catalyst to more desirable materials and the products are removed from the vessel through the conduit 14 to fractionation and processing apparatus, not shown. The spent catalyst is withdrawn continuously from the bottom of the vessel and introduced into a depressurizer 15, usually, where the pressure is reduced practically to atmospheric. This is done, primarily, because it is simpler and more economical to regenerate or restore the contact material at substantially atmospheric pressure.

The depressurized catalyst is gravitated downwardly as a compact column through the regenerator or kiln 16 wherein it is contacted with combustion supporting gas and the coke deposits are burned. The catalyst may enter the vessel at a temperature in the neighborhood of 800–900° F. and be removed therefrom at a temperature in the neighborhood of about 1000–1300° F. Temperatures much higher than the above heat damage the catalyst impairing its catalytic activity. Where only a heat carrying medium is required, however, inert refractory particles, such as corhart or mullite, may be used and restored at temperatures well in excess of the above without damage. In order to control the temperature in the kiln, cooling coils may be utilized. Air is introduced into the kiln 16 through the conduit 17 and travels both upward and downward through the bed, being withdrawn through the conduits 18, 19.

The catalyst is withdrawn from the bottom of the kiln through the conduit 20. The catalyst is depressurized, if necessary, in the vessel 26, which also provides an outlet for any lift gas which passes upwardly through the catalyst column in the conduit 22.

The lift pipe 23 may be a suitably elongated substantially vertical tube, preferably of circular cross-section, although other shapes may be utilized. The feed pot or mixture vessel 24 is located at the bottom of the pipe and the settling vessel 25 is located at the top of the pipe with the ends of the pipe projected into each vessel. Gravitating granular catalyst is introduced in the top of the feed pot 24 through the conduit 22, the column of granular material being long enough to provide smooth feeding of the material into the vessel. The granular material forms a compact mass of particles around the lower end of the lift pipe. A lift gas is introduced into the mixing vessel 24 through the conduit 27 to lift the particles upwardly through the lift pipe 23. The catalyst circulation rate is adjusted by changing the flow rate of the lift gas passing through the conduit 27.

The settling vessel 25 is substantially larger in cross-section than the lift pipe, causing the velocity of the lift gas to decrease after it leaves the lift pipe. The granules settle from the gas, falling onto a substantially compact bed thereof maintained in the lower section of the settling vessel. The granular material is withdrawn from the settling vessel through the feed leg 10 as a substantially compact column.

The lift gas may be any suitable gas, such as, for example, air, flue gas, nitrogen or superheated steam. As previously indicated, fines are produced by the erosion of catalyst in the columns or by the impinging of the catalyst against the walls of the vessels or against itself. The fines mixed with the gas do not readily settle out in the settling vessel with the mass of granular material but tend to remain in suspension. By keeping the upward gas velocity broadly between about 2 to 12 ft. per sec. and preferably about 2 to 5 ft. per sec. the granules settle satisfactorily but the fines are retained in the gas. At 12 ft. per sec. the gas will lift catalyst particles of about 20 mesh Tyler whereas at 5 ft. per sec., the gas will lift no larger than about 48 mesh Tyler particles. At 2 ft. per sec., the gas will lift particles no larger than about 65 mesh Tyler. The procedure is seen, therefore, to effect continuous elutriation of the moving catalyst in these moving bed systems which utilize pneumatic transfer of the catalyst.

Figure 2:
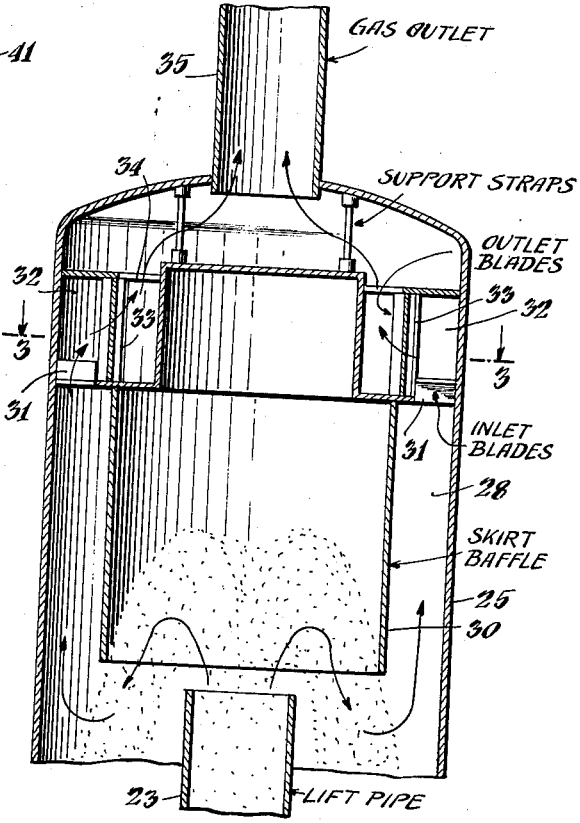
Figure 2 is a vertical view in cross section of the top of the settling vessel.

Referring now to Figure 2, the top section of the settling vessel is shown in cross-section. The settling vessel 25 has a substantially circular horizontal cross-section. A skirt baffle 30 is supported in the vessel by support straps from the roof. The baffle has a substantially circular horizontal cross-section and is located about on a common axis with the vessel and lift pipe. The lower end of the baffle skirt is terminated near the top end of the lift pipe. The baffle and vertical wall of the vessel 25 form an upwardly directed annular passageway 28. It has been found that in order to avoid high attrition in the settling vessel, the granular particles should be discharged from the top of the lift pipe 23 at a velocity less than 35 ft. per sec., and preferably between about 5–25 ft. per sec. This is disclosed in more detail in a copending application for United States patent filed February 14, 1951, Serial No. 210,942, directed primarily to a suitable gas lift for lifting granular contact material and its method of operation. The cross-section of the skirt baffle should be between about 5 to 15 times larger than the cross-section of the top end of the pipe, to effect a reversal of the gas, fines and granules and a satisfactory settling of the granules onto the bed surface about the lift pipe. The annular passageway 28 is about 3 to 12 times greater in cross-section than the lift pipe, and preferably about 4 to 10 times larger. This provides a gas velocity in the passageway which is broadly about 3 to 15 ft. per sec., and preferably about 5 to 10 ft. per sec. As indicated, the gas, granules and fines issue from the top of the lift pipe in an upward direction and they are directed downward by the baffle. The moving gas reverses its direction again around the skirt of the baffle, whereas the granules continue downward to the bed. The gas velocity in the annular passageway is sufficient to keep the fines entrained in the gas, but not high enough to lift the granules, or at least not high enough to reverse the direction of the granules and then lift them up the passageway.

An annular chamber 32 is located above the annular passageway. A multiplicity of radial slots are located in the floor of the chamber, substantially equally distributed about the floor of the chamber. A multiplicity of flat inlet blades, having their axes radially-directed, are located about the floor of the chamber, one on each side of the slots. The blades are projected into the chamber in a generally tangential direction, so as to provide inlet passages between adjacent blades and cause the gas and fines passed therethrough to swirl in said chamber. The chamber 32 has a multiplicity of substantially vertical slots substantially equally distributed about the inner wall thereof. A multiplicity of flat outlet blades, having their axes located substantially vertical, are arranged one on each side of said slots. The outlet blades are projected into said chambers in a generally tangential direction, which is similar to that of the inlet blades. Adjacent pairs of outlet blades form passages through which gas is withdrawn, substantially free of fines, into a receiving zone 34 formed between the skirt baffle 30 and the top of the vessel. The conduit 35 projects through the roof of the vessel and communicates with the receiving zone, so as to provide an outlet for the gas. In place of the flat inlet and outlet blades, other baffle means could be used, such as curved baffle plates, a multiplicity of conduit elbows arranged radially about the chamber etc. The inlet blades should be at an angle of about 10 to 20 degrees with the horizontal. The outlet blades should be at an angle of about 10 to 20 degrees with a tangent drawn to the inner wall at the location where the outlet blade contacts the wall.

Referring to Fig. 3, the chamber is shown in horizontal cross-section. It is seen that the gas makes a substantially complete change of direction in passing through the chamber. Most of the gas is withdrawn through the outlet passages, and the remainder swirls around the chamber with the bulk of the fines. The duct 40 is attached to the wall of the vessel in a tangential direction and communicates with the interior of the chamber, so as to receive the remaining gas and entrained fines. The withdrawn gas and fines are transferred to ground level through the conduit 41. Inasmuch as the particles are still dispersed in gas, there is no danger of bridging or plugging of this long line. And yet, the downcomer does not have to be excessively large in diameter because most of the gas is withdrawn from the top of the vessel to discharge. For example, about 90 per cent of the gas is normally withdrawn from the top of the vessel and about 10 per cent of the gas is passed down through the downcomer with the entrained fines. Referring to Figure 1, the downcomer connects to a separating vessel 42, near ground level. This may be a small cyclone adapted to discharge fines-free gas from the top through the conduit 46 and a stream of collected fines from the bottom through the conduit 43. Because of the small amount of gas handled by this separator, it can be simpler and cheaper than would otherwise be required. The fines can be collected in a bin 44 or other suitable means. The conduit 43 is made short enough and large enough in cross-section to prevent plugging.

Figure 4 illustrates the relation of the inlet and outlet blades 31, 33. The complete reversal of direction of the major gas stream is indicated, in addition to the close spatial relationship of the blades. By splitting the gas stream into a multiplicity of small streams, the separation of fines from the major portion of the gas is made more effective and complete.

The Figure 5 illustrates the circumferential attachment of the shave-off duct or conduit 40. The duct is attached circumferentially to readily receive the dust laden gas with practically no change in gas direction, thereby preventing the fines from separating from this gas stream.

One broad form of the invention comprises discharging a granular contact material and fines with lift gas from the upper end of a lift passage into a first separating zone located at a high elevation, wherein the granular particles are removed for reuse in a moving bed conversion process. The gas and entrained fines are transferred to a second separating zone, located at about the same elevation, where most of the gas is withdrawn substantially free of fines and the rest of the gas is withdrawn containing the bulk of the fines to a third separating zone, located near ground level. The fines are removed from the gas in the third separating zone and are thereby salvaged.

In another broad form of the invention, gas, granules and fines are discharged from an upwardly directed lift passage into a settling zone. The upward velocity of the gas in this zone is adjusted to effect settling of the granules on a bed of the material near the top of the passage for their subsequent reuse in a continuous moving bed conversion process. The velocity is so adjusted, however, that the fines remain in the gas and are withdrawn with the gas, providing continuous elutriation of the solids.

In a more specific form, the invention comprises a settling vessel with an upwardly directed lift pipe terminated intermediate the top and bottom of the vessel. Baffle means is located above the lift pipe in said vessel, adapted to substantially reverse the direction of granular material, fines and gas issuing from the upper end of the pipe to the downward direction. At least one upwardly directed passageway is located in the vessel terminated at its lower end near the top of the lift pipe. The cross-section of the passageways is made about 5 to 15 times larger than the cross-section of the lift pipe, so that the gas makes another reversal of direction up the passageways to discharge, carrying with it the fines. The granules continue downward to a bed of the material and are withdrawn from the lower portion of the vessel for reuse in a moving bed conversion process.

Another more specific form of this invention includes a separator in the top of the settling vessel for separating for discharge most of the gas from the mixture of gas and fines. The remaining gas and fines are discharged from the separator downwardly through a downcomer to a second separator near ground level where the fines are recovered from the gas.

Other more specific forms of the invention have been disclosed in detail previously. A specific example of the invention is given hereinbelow, for illustrative purposes only.

*Example*

A separating vessel, similar to the one shown on Figures 2, 3, 4 and 5, was designed for a 3,000 bbl. per stream day moving bed cracking system. The following are the pertinent dimensions of the separating vessel and related apparatus:

| | |
|---|---|
| Diameter of vessel | 7 ft. |
| Diameter of skirt baffle at bottom | 5 ft., 9 in. |
| Height of skirt baffle | 8 ft., 6 in. |
| Diameter of skirt baffle at top | 5 ft. |
| Diameter of lift pipe | 22½ in. |
| Vertical distance from bottom of skirt baffle to top of lift pipe | 8 in. |
| Horizontal thickness of annular passageway between skirt baffle and vertical wall of vessel | 7 in. |
| Location of inlet blades above the lower end of the baffle skirt | 5 ft., 6 in. |
| Number of inlet blades | 40. |
| Horizontal distance between inlet blades at outside edge of blades | 6½ in. |
| Pitch of inlet blades relative to horizontal | 15 degrees. |
| Length of inlet blades | 8½ in. |
| Thickness of inlet blades | ⅜ in. |
| Number of outlet blades | 40. |
| Height of outlet blades | 2 ft., 8 in. |
| Length of outlet blades | 71¹¹⁄₁₆ in. |
| Thickness of outlet blades | ⅜ in. |

The inner 2⅜" discharge end of each outlet blade is bent inward ⅛" to provide substantially parallel sided discharge passages.

| | |
|---|---|
| Height of single shave-off aperture | 2 ft., 5¾ in. |
| Width of said shave-off aperture | 1 ft., 1 in. |
| Diameter of downcomer from settling vessel to separator near ground level | 6 in. standard pipe. |
| Length of downcomer | 110 ft. |

The specific example is given only as an illustration of the invention, and is not to be considered as limiting the range of the invention. It is intended that the scope of this invention be considered broadly to cover all changes and modification of the examples of the invention herein chosen for purposes of the disclosure, which do not constitute departures from the spirit of the invention.

I claim:

1. Apparatus for separating granular contact material, fines and lift gas discharged at a level substantially above the ground from the top end of an upwardly directed lift pipe comprising in combination: a settling vessel attached to the upper end of the lift pipe, having a substantially larger cross-section than said lift pipe, the pipe terminated intermediate the top and bottom of the vessel, baffle means located above said lift pipe, so as to direct the granular material, fines and gas in a downward direction, means defining at least one outlet aperture in the lower portion of the vessel, through which granular material can be removed, means defining an upwardly directed passageway in said vessel, the lower end of the passageway terminated not substantially above the top of the lift pipe, so located to substantially prevent direct transfer of the lift gas from the lift pipe to said passageway, means located in said passageway, adapted to separate gas and entrained fines passing therethrough into two streams, the first substantially free of fines, the second containing the bulk of the fines, means for withdrawing the first stream of gas from said vessel, conduit means for withdrawing the second stream of gas from said vessel downward to a level near the ground, a second separation means attached to said conduit means near ground level, and means for withdrawing separate streams of gas and fines from said second separation means.

2. Apparatus for separating granular contact material, fines and lift gas discharged from the top end of an upwardly directed lift pipe comprising in combination: a settling vessel attached to the upper end of the lift pipe, having a substantially larger cross-section than said lift pipe, the pipe terminated intermediate the top and bottom of the vessel, baffle means located above said lift pipe, so as to direct the granular material, fines and gas in a downward direction, means defining at least one outlet aperture in the lower portion of the vessel, through which granular material can be removed, means defining an upwardly directed annular passageway in said vessel, the lower end of the passageway terminated near the top end of the lift pipe, the cross-section of the passageway being about 3 to 12 times larger than the cross-section of the lift pipe, an annular chamber within said vessel located above said annular passageway, a multiplicity of baffles substantially equally distributed about the chamber, projected through the wall of the chamber, so as to define between each adjacent pair of baffles a passage connecting the annular passageway and the chamber, the baffles directed in the chamber in a generally tangential direction, so as to effect a swirling of the gas and fines about the chamber, a second multiplicity of baffles substantially equally distributed about the chamber, projected through the wall of the chamber, so as to define between each adjacent pair of baffles a discharge passage from the chamber, the second set of baffles directed in the chamber in the same generally tangential direction as the first set, a discharge passageway attached to said chamber, adapted to effect withdrawal of gas through the passages formed by the second set of baffles and out of the vessel, and at least one tangentially-directed discharge duct communicating with said chamber, adapted to receive the remaining gas and fines without substantial change in gas flow direction and continuously remove them from the vessel.

3. Apparatus for separating granular contact material, fines and lift gas discharged at a level substantially above the ground from the top end of an upwardly directed lift pipe comprising in combination: a settling vessel attached to the upper end of the lift pipe, having a substantially larger cross-section than said lift pipe, the pipe terminated intermediate the top and bottom of the vessel, baffle means located above said lift pipe, so as to direct the granular material, fines and gas in a downward direction, means defining at least one outlet aperture in the lower portion of the vessel, through which granular material can be removed, means defining an upwardly directed annular passageway in said vessel, the lower end of the passageway terminated near the top end of the lift pipe, an annular chamber within said vessel located above said annular passageway, a multiplicity of baffles substantially equally distributed radially about the chamber, projected through the wall of the chamber, so as to define between each adjacent pair of baffles a passage connecting the interior of the annular passageway and the chamber, the baffles directed in the chamber in a generally tangential direction, so as to effect a swirling of the gas and entrained fines about the chamber, a second multiplicity of baffles substantially equally distributed radially about the chamber, projected through the wall of the chamber, so as to define between each adjacent pair of baffles discharge passages from the chamber, the second set of baffles directed in the chamber in the same generally tangential direction as the first set, a discharge passageway attached to said chamber, adapted to effect withdrawal of gas through the discharge passages formed by the second set of baffles and conduct it out of the vessel, at least one tangentially-directed discharge duct communicating with said chamber, adapted to receive the remaining gas and fines without substantial change in gas flow direction, conduit means attached to said duct, for withdrawing the gas and fines downward to a level near the ground, a second separation means attached to said conduit means near ground level, and means for withdrawing separate streams of gas and fines from said second separation means.

4. Apparatus for separating granular contact material, fines and lift gas discharged from the top end of an upwardly directed lift pipe, comprising in combination: a settling vessel of circular horizontal cross-section, approximately concentric with said lift pipe, having a substantially larger cross-section than said lift pipe, the pipe terminated intermediate the top and bottom of the vessel, a cylindrical skirt baffle located in said vessel above said lift pipe, substantially concentric with said vessel, the lower edge of said skirt baffle terminated at a level near the upper end of the lift pipe, at least one withdrawal conduit attached to the lower portion of the vessel, through which granular material is withdrawn, an annular passageway defined by the skirt baffle and vertical wall of the vessel, the cross-section of the passageway being between 4 to 10 times greater than the cross-section of the lift pipe, an annular chamber in said vessel above said annular passageway, means defining a multiplicity of radially-directed slots in the floor of said chamber, substantially equally distributed about the chamber, a multiplicity of inlet blades, having their axes radially-directed in the floor of the chamber, each blade being located between adjacent slots, the blades disposed at an angle of about 10 to 20 degrees with the horizontal, means defining a multiplicity of substantially vertcal slots in the inner wall of said chamber, substantially equally distributed about said wall of said chamber, a multiplicity of outlet blades, having their axes located substantially vertical, each blade being located between adjacent slots, the blades disposed at an angle of about 10 to 20 degrees with a tangent connected to the circumference of an imaginary circle passed through their axes, and directed in the chamber in the same direction as the inlet blades, a receiving chamber located in said vessel above said skirt baffle and communicating with said chamber through said vertical slots, means defining an outlet in the top of said vessel communicating with said receiving chamber, and a substantially horizontal discharge duct connected tangentially to the wall of said vessel, so as to communicate with the interior of said chamber through the outer wall of the chamber.

5. Apparatus for separating granular contact material, fines and lift gas discharged at a level substantially above the ground from the top end of an upwardly directed lift pipe, comprising in combination: a settling vessel of circular horizontal cross-section, approximately concentric with said lift pipe, having a substantially larger cross-section than said lift pipe, the pipe terminated intermediate the top and bottom of the vessel, a cylindrical skirt baffle located in said vessel above said lift pipe, substantially concentric with said vessel, the lower edge of said skirt baffle terminated at a level near the upper end of the lift pipe, the horizontal cross-section of the baffle being greater than the cross-section of the lift pipe, at least one withdrawal conduit attached to the bottom of the vessel, through which granular material is withdrawn, an annular passageway defined by the skirt baffle and vertical wall of the vessel, the cross-section of the passageway being between 4 to 10 times greater than the cross-section of the lift pipe, an annular chamber in said vessel above said annular passageway, the floor of the chamber, arranged substantially horizontal and possessing a multiplicity of substantially equally distributed radial slots, inlet blades, one between each adjacent pair of slots, at an angle of about 10 to 20 degrees with the horizontal, a multiplicity of substantially equally distributed vertical slots in the inner wall of the chamber, outlet blades, one between each adjacent pair of slots, at an angle of about 10 to 20 degrees with a tangent drawn to the inner wall at the location where the outlet blade contacts the wall, a receiving chamber defined by the top of said skirt baffle and the top of the vessel, communicating with said chamber through said vertical slots, the top of said vessel possessing an outlet which communicates with said receiving chamber, a discharge duct connected tangentially to the wall of said vessel, communicating with the interior of said chamber, a downcomer attached to said duct terminated near ground level, a separator attached to said downcomer at the lower end, means defining an outlet for gas from said separator and means defining an outlet for fines from said separator.

References Cited in the file of this patent

UNITED STATES PATENTS

| | | |
|---|---|---|
| 1,825,708 | Wagner | Oct. 6, 1931 |
| 2,328,240 | Wiegand | Aug. 31, 1943 |
| 2,419,097 | Stratford et al. | Apr. 15, 1947 |
| 2,503,013 | Watson | Apr. 4, 1950 |
| 2,561,409 | Ardern | July 24, 1951 |